(12) United States Patent
Ehrig et al.

(10) Patent No.: US 8,798,302 B2
(45) Date of Patent: Aug. 5, 2014

(54) FLAT PANEL LOUDSPEAKERS

(75) Inventors: Lutz Ehrig, Iimenau (DE); Daniel Beer, Martinroda (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 754 days.

(21) Appl. No.: 12/959,183

(22) Filed: Dec. 2, 2010

(65) Prior Publication Data

US 2011/0188661 A1 Aug. 4, 2011

Related U.S. Application Data

(60) Provisional application No. 61/265,905, filed on Dec. 2, 2009.

(30) Foreign Application Priority Data

Nov. 3, 2010 (WO) ............. PCT/EP2010/066698

(51) Int. Cl.
 *H04R 1/20* (2006.01)
 *H04R 1/34* (2006.01)
 *H04R 1/28* (2006.01)

(52) U.S. Cl.
 CPC ............. *H04R 1/34* (2013.01); *H04R 1/2853* (2013.01)
 USPC ............ 381/338; 381/337; 381/345; 381/388

(58) Field of Classification Search
 CPC .................. H04R 1/34; H04R 1/2853
 USPC .......... 381/155, 160, 304–306, 308, 333, 381/337–339, 350, 352, 388, 345
 See application file for complete search history.

(56) References Cited

U.S. PATENT DOCUMENTS

| | | | |
|---|---|---|---|
| 2,610,694 A * | 9/1952 | De Boer | 181/147 |
| 3,500,953 A | 3/1970 | Lahti | |
| 5,898,137 A * | 4/1999 | Saito | 181/144 |
| 5,943,430 A * | 8/1999 | Saitoh | 381/160 |
| 6,343,132 B1 * | 1/2002 | Fukuhara et al. | 381/339 |
| 6,533,063 B1 * | 3/2003 | Ikeuchi et al. | 181/176 |
| 7,010,138 B1 | 3/2006 | Harris et al. | |
| 8,254,623 B2 * | 8/2012 | Okumura | 381/388 |
| 2004/0125969 A1 | 7/2004 | Kieltyka et al. | |

FOREIGN PATENT DOCUMENTS

| | | |
|---|---|---|
| CN | 1279561 | 1/2001 |
| CN | 101031222 | 9/2007 |
| WO | 1 067 818 A2 | 1/2001 |
| WO | WO 01/39541 A2 | 5/2001 |
| WO | WO-2005/112697 | 12/2005 |
| WO | WO 2007/085305 A1 | 8/2007 |

* cited by examiner

*Primary Examiner* — Curtis Kuntz
*Assistant Examiner* — Ryan Robinson
(74) *Attorney, Agent, or Firm* — Michael A. Glenn; Perkins Coie LLP

(57) ABSTRACT

A flat panel loudspeaker with such an emission characteristic is obtained which, in the event of the flat panel loudspeaker being set up inversely, provides an improved listening result in that a loudspeaker is provided within the housing, and a sound conduction is configured such that sound from the loudspeaker is conducted outward via an acoustic aperture within the housing for undirected emission.

27 Claims, 8 Drawing Sheets

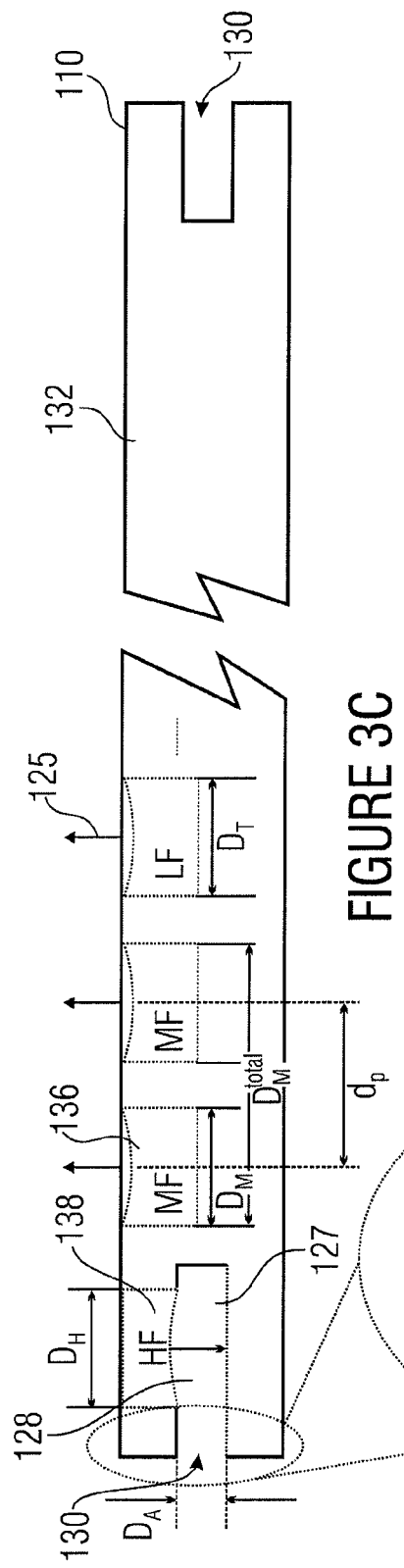
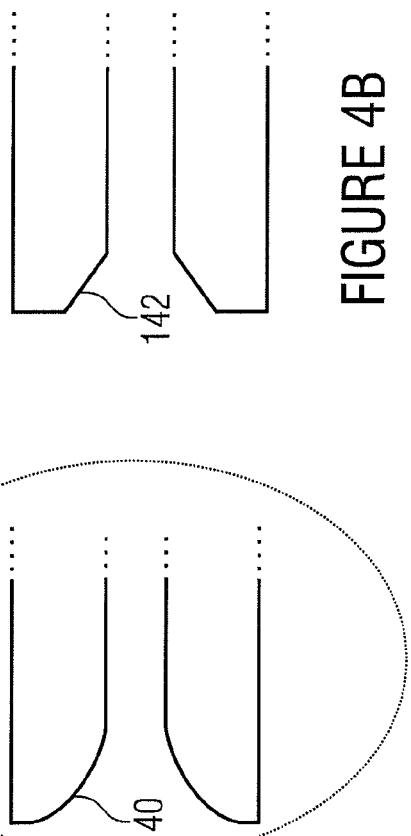
FIGURE 3C
FIGURE 4A
FIGURE 4B

FLAT PANEL LOUDSPEAKERS

CROSS-REFERENCE TO RELATED APPLICATIONS

This application claims priority to U.S. Provisional Patent Application Ser. No. 61/265,905, filed Dec. 2, 2009, and PCT patent application Ser. No. PCT/EP2010/066698 filed 3 Nov. 2010, which are incorporated herein in their entirety by this reference thereto.

DESCRIPTION

The present invention relates to a flat panel loudspeaker as may be employed, for example, with flat screens or with a TV set.

For specific applications, loudspeakers with a low constructional depth, e.g. smaller than 2 cm, are required, such as with TV sets and flat screens. Existing FLS (flat loudspeaker) technologies already enable a constructional depth of 2 cm and less. DE 102009010278.7 describes, for example, an FLS technology based on an array of miniature converters that are built into a closed housing. With this technology, even flat loudspeakers having a housing depth of smaller than/equal to 10 mm may be produced. The miniature converters emit directly toward the listener.

For specific applications, such as for TV sets and flat screens with a front fully covered by the display, however, said loudspeakers must not be visible from the front, and therefore cannot emit sound directly toward the listener. The diaphragm normal therefore cannot point in the direction of the listener, and due to the low constructional depth required, lateral orientation of the diaphragm normal is also not possible. However, for a listening experience, the sound must arrive at the listening location, i.e. must move forward. In the low-frequency range, this is not so critical since the sound propagates in every direction in an undirected manner. Spherical sound propagation occurs whenever the wavelength is considerably larger than the diaphragm diameter, which is the case within the low-frequency range. However, this does not work for the high-frequency range. The sound-emitting surface area, i.e. the loudspeaker diaphragm, is too large for high tones as compared to the wavelength to be emitted. Undirected sound emission therefore cannot take place. Rather, only directed sound emission occurs, which, specifically, is directed rearward.

One possible solution to this problem would be to reduce the size of the diaphragm, or to reduce the diaphragm diameter, which, conversely, would lead to an insufficient sound pressure level, however. Rearward emission would not be critical as long as reflection via a wall located behind the flat panel loudspeaker would be possible. However, in this case, the functionality of the loudspeaker would be highly dependent on the position of the flat panel loudspeaker in relation to the wall and on the reflection property of the wall itself, which in many cases of application is not acceptable. In addition, for specific applications, such as with TV sets, stereo reproduction is to be achievable, i.e. spatial separation of the channels, i.e. of the left and right channels. Such spatial separation is required, in particular, e.g. within the frequency range above 100 Hz to 200 Hz, since the frequency range below this is less important for directional stereo impression.

Therefore, it is the object of the present invention to provide a flat panel loudspeaker that also enables allowing a high-quality listening experience when set up in an inverted manner, i.e. with its rear facing the listener, without requiring specific additional measures, or without the setup location being restricted due to the necessity of the existence of a reflecting wall.

This object is achieved by a flat panel loudspeaker as claimed in claim 1.

One core idea underlying the present invention consists in that a flat panel loudspeaker may be obtained with such an emission characteristic which provides, in the case of inverted setup of the flat panel loudspeaker, improved listening result when a loudspeaker is provided within the housing, and sound conduction is configured such that sound from the loudspeaker is conducted outward for undirected emission via an acoustic aperture within the housing.

In accordance with an embodiment, the acoustic aperture and the sound conduction is configured in the form of a slot within the housing, said slot extending laterally within the housing and opening laterally within same, and the acoustic aperture is—at least in one dimension—smaller than a loudspeaker diaphragm diameter, or smaller than a wavelength of the highest frequency of the sound from the loudspeaker. Thus, the sound may propagate, behind the acoustic aperture, in an undirected manner, e.g. in a cylinder shape or spherical shape, and may thus also move forward to get to the listener.

Advantageous implementations are the subject matter of the dependent claims. Preferred embodiments of the present invention will be explained below in more detail with reference to the accompanying figures, wherein FIG. 1 shows a schematic representation of a flat panel loudspeaker in accordance with an embodiment in a set-up state, wherein the rear of the flat panel loudspeaker faces the listener;

FIG. 3C shows a sectional view of a flat panel loudspeaker in accordance with FIG. 3B;

Figure 3A:
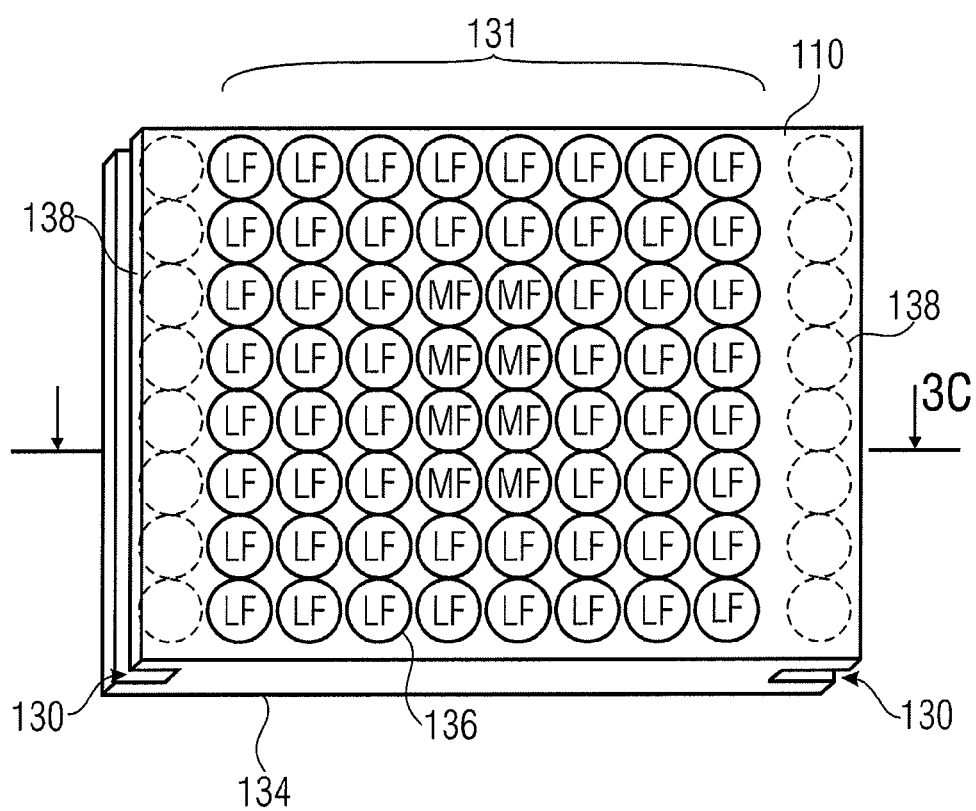
FIG. 3A shows a spatial view of a flat panel loudspeaker in accordance with an embodiment, wherein the front side is visible.
Figure 3B:
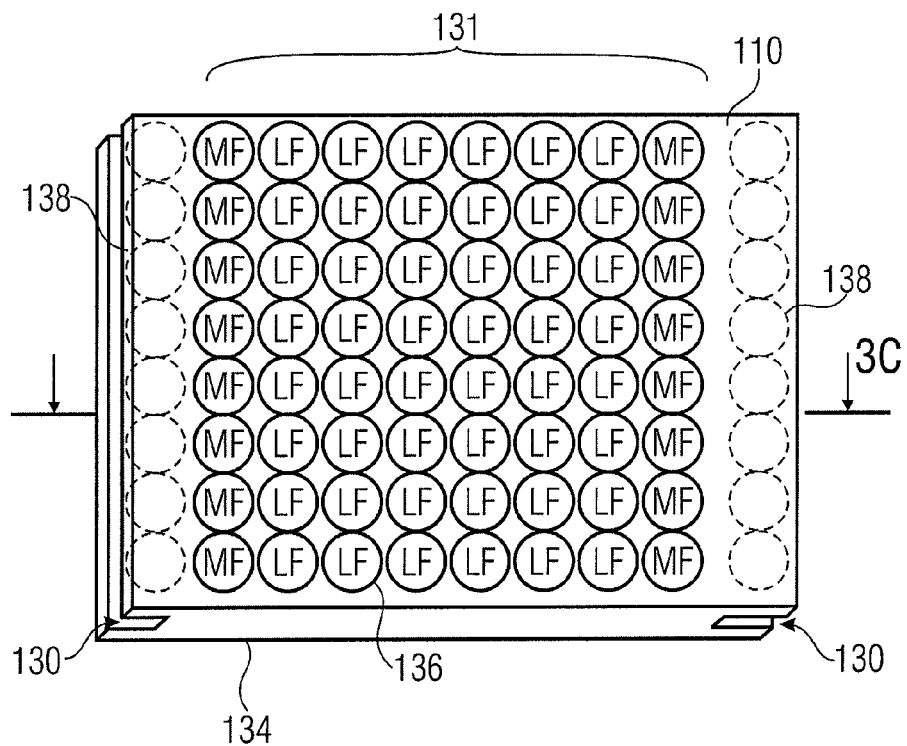
FIG. 3B shows a spatial view of a flat panel loudspeaker in accordance with a further embodiment, wherein the front side is visible.
Figure 5:
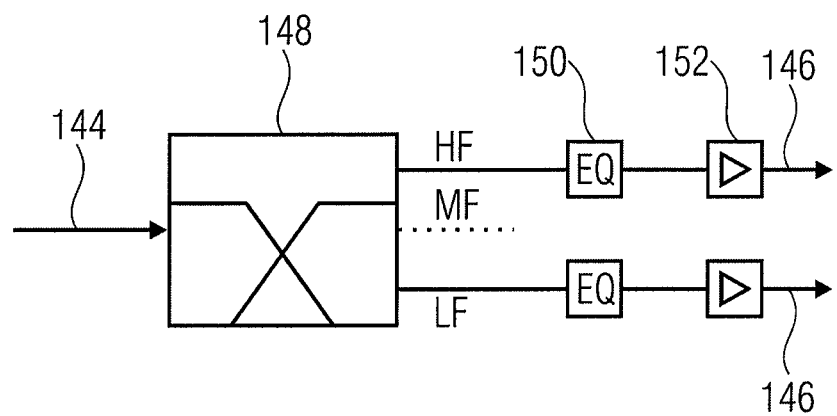
Figure 6:
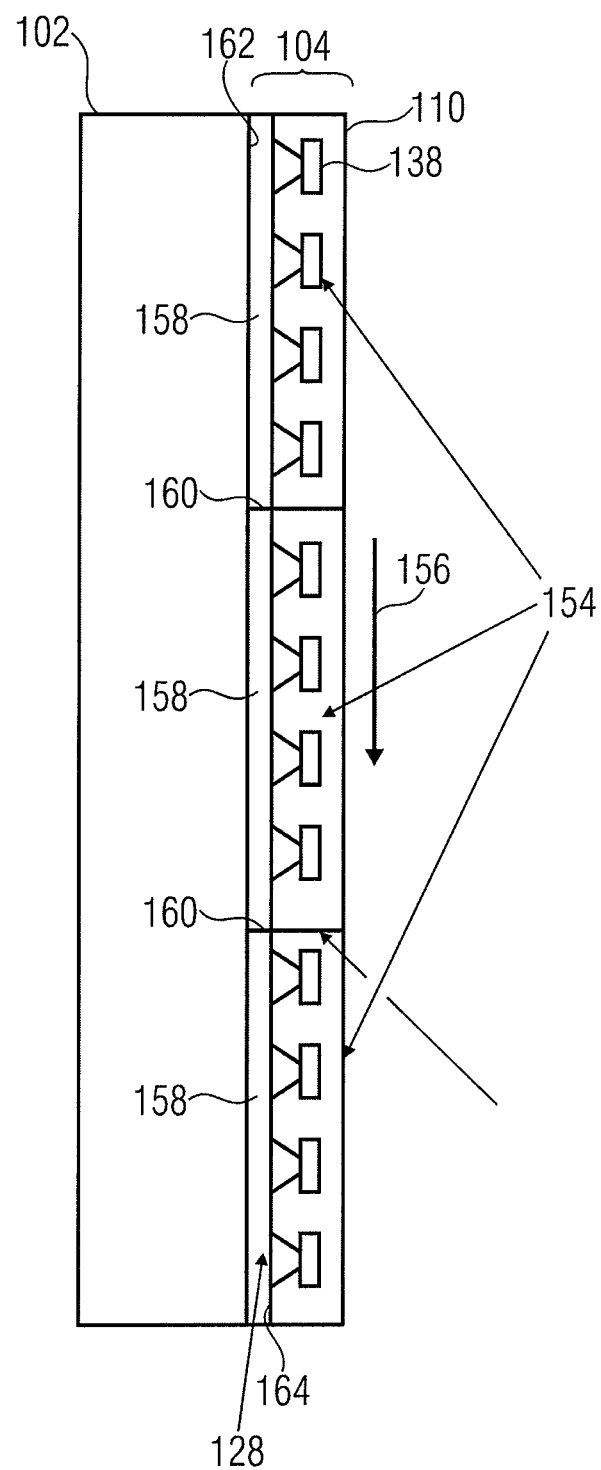
Figure 7:
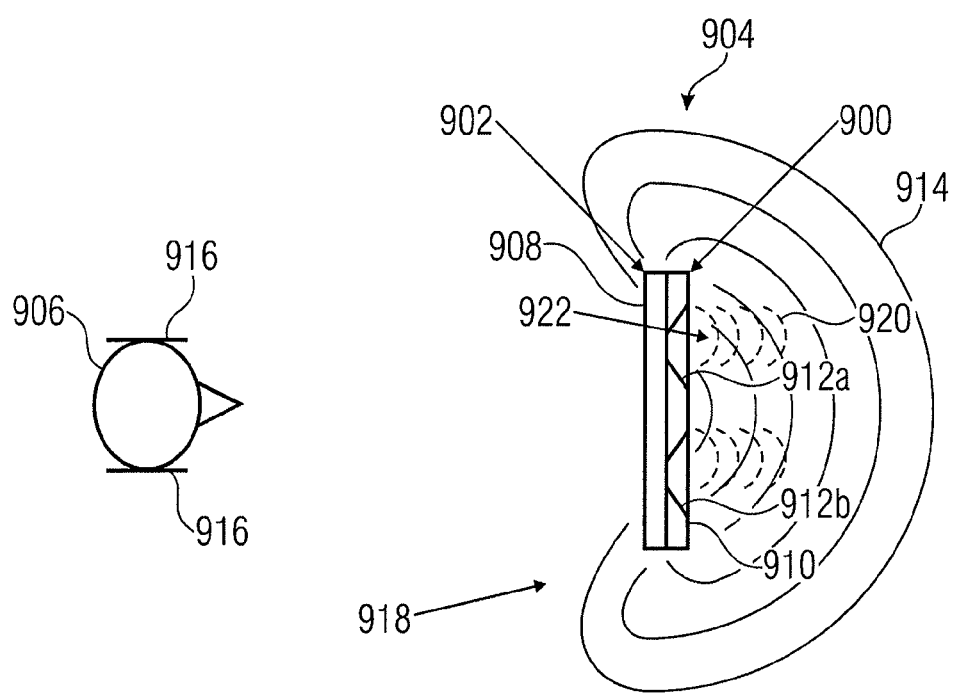

FIGS. 4A,B show partial views of a section of FIG. 3B in accordance with various embodiments, wherein the acoustic aperture is visible;

FIG. 5 shows a block diagram of potential drive of a flat panel loudspeaker in accordance with an embodiment;

FIG. 6 shows a side view of a flat panel loudspeaker in accordance with a further embodiment; and FIG. 7 shows a schematic representation of a flat panel loudspeaker in accordance with a comparative example in the case of inverted setup in relation to a listener.

Before embodiments of the present application are described with reference to FIGS. 1 and 5, the problem that occurs when a flat panel loudspeaker is to be set up with its rear facing the listener, such as in the event that the flat panel loudspeaker 900 is to be "hidden" behind a display 902 of a TV set or flat screen 904 comprising the two components, is to be initially discussed in more detail with reference to FIG. 7.

Accordingly, FIG. 7 shows a listener 906 looking at the display 902, which in turn faces the listener and viewer 906 with the image-displaying front side 908. The display 902 and the flat panel loudspeaker 900 are arranged, or mutually attached, back to back. I.e. a front side 910 of the flat panel loudspeaker 900 faces away from the listener 906, and the rears of the display 902 and the flat panel loudspeaker 900 face each other. In this example, the front side 910 at the same time constitutes the rear of the TV set, or flat screen, 904.

It shall be assumed that the flat panel loudspeaker 900 of FIG. 7 comprises at least low-frequency loudspeakers and high-frequency loudspeakers that are arranged such that they are distributed across the rear 910 so as to emit in that direction of the rear 910 that is normal to the surface. In FIG. 7, only two loudspeakers 912a and 912b are indicated by way of example. Due to the different wavelengths emitted by the low-frequency loudspeakers and the high-frequency loudspeakers, the emission behavior of said loudspeakers also differs. The low tones of the low-frequency loudspeakers diffract, as is indicated by continuous lines 914, around the housing of the TV set or flat screen 904 and thus reach the listener 906, or his/her ears 916, as is indicated at 918. However, emission of the high-tone portion by the high-frequency loudspeakers is directed, as is indicated by a dashed line 920 and the arrow 922 in FIG. 7. I.e. there is no diffraction that might redirect the sound 920 toward the listener 906. This means that the listening result in the case of FIG. 7 is unacceptable unless other measures are taken, such as placing a suitable wall as a reflector in the viewer direction behind the flat panel loudspeaker 900, or the like, to ensure that the sound reaches the listener.

The problem just described actually occurs only because the loudspeaker is to be unnoticeable from the front, but rather, the flat panel loudspeaker 900 is to face the listener with its rear. In the example of FIG. 7, this enables a larger lateral image area of the display 902 while maintaining the lateral extension of the housing. In other applications, without the display 902, the loudspeaker 900 would quite generally allow freer utilization, or multiplication of the design options with regard to the layout of the rear of the flat panel loudspeaker 900, which in this case will serve as the visible front side.

The embodiments described below enable achieving said very advantages with an inverted orientation of a flat panel loudspeaker, in which case, however, the listening result is improved without requiring additional measures that would end up strongly limiting the application and setup possibilities, such as the provision of a reflector wall that has already been mentioned, etc. In particular, the embodiments described below enable even the high-tone sound to move forward to reach the listener, even if the front side of the flat panel loudspeaker faces away from the listener and if, in turn, the rear of same faces the listener.

Figure 1:
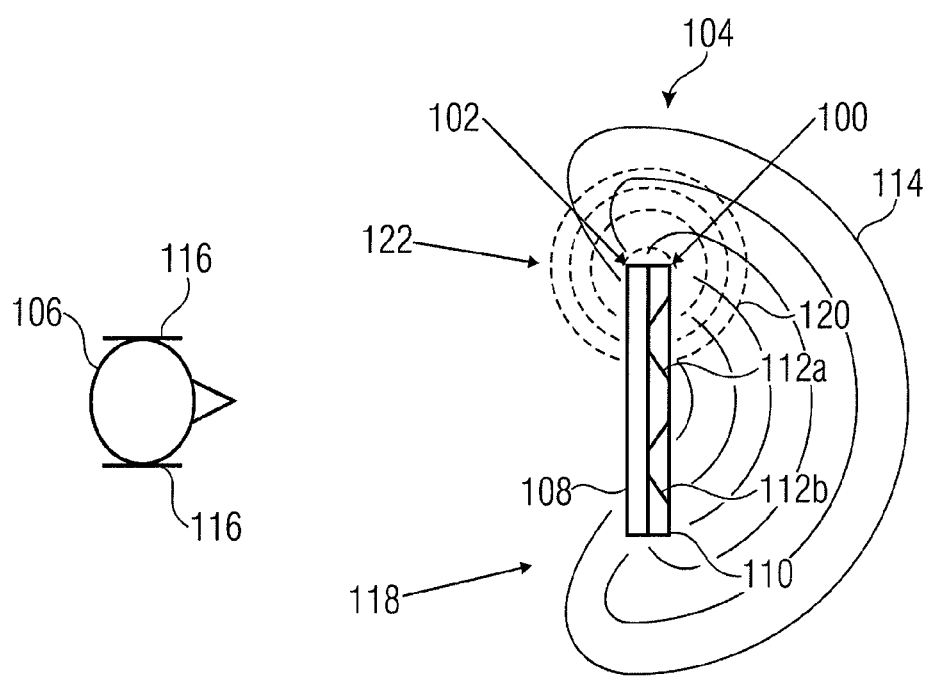

FIG. 1 shows the situation of FIG. 7 with a flat panel loudspeaker in accordance with an embodiment of the present invention. In the case of FIG. 1, the elements corresponding to the elements of FIG. 7 are designated by reference numerals that differ from those of FIG. 7 only in their first digit, respectively; specifically, they have a "one" instead of a "nine", which is why previous explanations relating to FIG. 7 should also apply to FIG. 1, unless any differences are explicitly pointed out below.

In particular, the flat panel loudspeaker 100 of FIG. 1, too, is one that, together with a display 102, forms a TV set or flat screen 104 that for this purpose are mutually arranged, and interconnected, back to back. In the embodiment of FIG. 1, the lateral extension of the display 102 is equal to the lateral extension of the flat panel loudspeaker 100, or of the housing of the flat panel loudspeaker 100, which is why forward sound emission toward the listener 106 is not possible in a direct manner.

As in the case of FIG. 7, the flat panel loudspeaker 100 and its rear 110 comprises a two-dimensional lateral distribution of loudspeakers 112a and 112b, respectively, such as electro-dynamic transducers. However, these loudspeakers 112a and 112b are mid-frequency and/or low-frequency loudspeakers for emitting the mid- and/or low-tone portion 114, which, due to the larger wavelength as compared to a lateral diaphragm extension, or a diaphragm diameter of the loudspeakers 112a and 112b, is emitted in an undirected manner and may diffract around the housing of the flat panel loudspeaker 100, or of the device 104, as is indicated at 118.

To generate the high-tone portion 120, a high-frequency loudspeaker not illustrated in FIG. 1 is provided whose emitted sound is conducted outward within a sound conduction, such as a slot, also not illustrated in detail in FIG. 1, to an acoustic aperture laterally within a housing of the flat panel loudspeaker 100 for undirected emission. From there, in the case of FIG. 1, where the aperture is formed to be oblong, as a slot, with its longitudinal axis extending vertically, and where, thus, the condition that the extension of the aperture be smaller than the wavelength of the high-tone sound of the high-frequency loudspeaker is met only in one dimension, namely in the horizontal, the sound propagates in an almost cylindrical manner and thus also moves forward toward the listener 106 and his/her ears 116, as is indicated at 122.

In accordance with the embodiment of FIG. 1, all of the advantages described above with reference to FIG. 7 have thus been made achievable without the disadvantages with regard to the listening result of the user 106.

In other words, the flat panel loudspeaker of FIG. 1 enables a better listening result with regard to the high-tone portion even when the listener is positioned on the rearward side of the flat panel loudspeaker 100 in that a loudspeaker and a sound conduction are arranged within the housing, and that the sound conduction is configured such that the sound from the loudspeaker is conducted outward for undirected emission via an acoustic aperture within the housing. The acoustic aperture is formed laterally within the housing of the flat panel loudspeaker 100. It takes up any usable space neither on a rear nor on the front side 110 of the flat panel loudspeaker 100. In addition, the angle at which the sound is to be deflected toward the listener 106 is smaller than if the acoustic aperture were directed rearward.

For the undirectionality of the emission, a surface area of the acoustic aperture is smaller, for example, than a lateral area dimension of the diaphragm of the corresponding high-frequency loudspeaker. In other words, in accordance with the present embodiment, the acoustic aperture is smaller than a diameter of a loudspeaker diaphragm. Alternatively, a size of the acoustic aperture may be set to be smaller than the wavelength of a highest frequency of the sound emitted by the corresponding high-frequency loudspeaker.

With regard to FIG. 1, it shall also be noted that, even though FIG. 1 only depicts the emission at an acoustic aperture on the left side—as seen from the listener's perspective—of the flat panel loudspeaker 104, a further acoustic aperture with a further high-frequency loudspeaker may naturally be arranged on the opposite right side, as seen from the listener's perspective. In this case, the high-frequency loudspeaker depicted at the top in FIG. 1 may be a high-frequency loudspeaker associated with a left-hand stereo channel, whereas the high-frequency loudspeaker depicted at the bottom in FIG. 1 would be associated with the right-hand stereo channel. In an alternative embodiment, instead of the two lateral apertures, one might be provided at the upper edge of the loudspeaker housing, and a further one might be provided at the lower edge of the loudspeaker housing, so as to thus form a mono loudspeaker.

Figure 2:
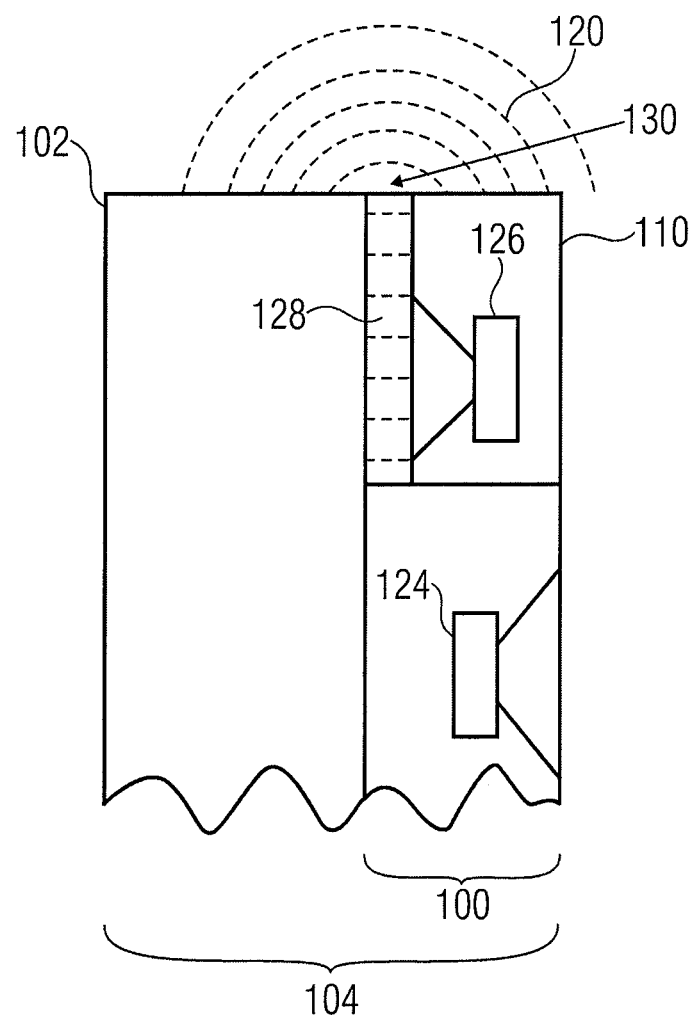
FIG. 2 shows a schematic partial sectional top view of the flat panel loudspeaker of FIG. 1 in accordance with an embodiment.

With reference to FIG. 2, a possibility of how the acoustic aperture, the sound conduction, and the associated loudspeaker might be formed, or arranged, within the housing will now be described below. FIG. 2 shows a magnified partial sectional top view of the flat panel loudspeaker. With regard to the reference numerals, it shall once again be pointed out that the same reference numerals have been used as in FIG. 1 as far as elements are concerned that are identical or identical in function. For these elements, please refer to the above description of the figures. This indication shall also apply, below, to the descriptions of the following figures.

FIG. 2 shows a mid- or low-frequency loudspeaker 124 arranged on the front side 110 of the flat panel loudspeaker 100 so that it emits away from the front side 110, i.e. in the direction of the normal to surface of the front side 110, rearward direction, i.e. away from the listener. Said mid- or low-frequency loudspeaker 124 may be part of an array as was described above. Further out in the lateral direction, FIG. 2 shows a high-frequency loudspeaker 126 which does not emit outward but into the interior of the housing. To achieve a flat structural shape of the loudspeaker housing, this loudspeaker, too, is arranged with its diaphragm normal parallel or antiparallel to the diaphragm normals of the loudspeaker 124. Even though the loudspeaker 126 might be accommodated in the rear of the loudspeaker, i.e. in that part of the housing which faces the listener and the TV set 102, i.e. with its diaphragm normal parallel and facing the same dimension as the loudspeakers 124, the loudspeaker 126 is arranged, in FIG. 2, such that it emits in the direction of the listener, i.e. it is mounted to the front wall 110 of the housing, or enclosed into same, such as into a corresponding bore, and it emits into the interior of the housing, namely the sound conduction 128, in the direction of the rear wall of the housing. In this case, all of the loudspeakers have been built into the same wall, namely the front wall 110 of the housing, such as into respective bores or depressions for example. In other words, the rear of the display 102 and a frame, not separately represented in FIG. 2, for the loudspeakers 124, 126 together form a housing having a slot, or gap, 128, wherein the high-frequency loudspeaker 126 emits the high-tone sound 120 generated by it. Thus, the gap 128 acts as a sound conduction filled with a sound-conducting medium, namely air in the present case, and conducts the sound 120 laterally along the housing outward, i.e. to the acoustic aperture 130 at which the sound conduction 128 opens. FIG. 2 thus shows an example of a flat panel loudspeaker having a housing and a loudspeaker 126 within same, as well as a sound conduction which conducts the sound 120 from the loudspeaker 126 outward via an acoustic aperture 130 within the housing for undirected emission. As may be seen in FIG. 2, the size of the acoustic aperture is smaller than a loudspeaker diaphragm diameter 126 of the loudspeaker, and the high-tone frequency range, for the emission of which the loudspeaker 126 is responsible in accordance with an upstream frequency splitter, has a largest frequency, for example, with a wavelength larger than the acoustic aperture 230. In the case of FIG. 2, undirected emission of the type of cylindrical sound propagation has been illustrated.

As was already indicated in FIG. 2, the mid- and/or low-frequency loudspeaker 124 may be configured as part of a two-dimensional distribution of electroacoustic transducers. In other words, the flat panel loudspeaker 100 may also have a two-dimensional distribution of electroacoustic transducers as mid- and/or low-frequency loudspeaker(s). This is shown in FIG. 3a. In accordance with this embodiment, the flat panel loudspeaker comprises, laterally within an interior of the area 131 of the front side 110 of the housing generally indicated by 134 in FIG. 3a, a two-dimensional distribution of electroacoustic transducers 136 provided to emit outward from the front side 110. As is shown in FIG. 3a, the loudspeakers may be regularly arranged in rows and columns, for example.

In the embodiment of FIG. 3a, the flat panel loudspeaker is a 3-way loudspeaker, wherein some—preferably a majority—of the electroacoustic transducers 136 act as low-frequency loudspeakers, whereas the remaining portion of the distribution of transducers within the region 131 act as mid-frequency loudspeakers, as is indicated by "LF" and "MF", respectively. Here in FIG. 3a, the mid-frequency loudspeakers are arranged in between the individual loudspeakers 136 and are surrounded by the low-frequency loudspeakers. An embodiment with an inverse setup will be described below.

A corresponding frequency splitter takes over varying control, or control of the low- and/or mid-frequency loudspeakers, with a different frequency range of an audio signal to be reproduced, as will be described later on with reference to FIG. 5. However, it shall be noted that any other multi-dimensional distribution of transducers 136 is also possible, as is the provision of only mid-frequency loudspeakers or low-frequency loudspeakers in order to form a 2-way flat panel loudspeaker. For example, the electroacoustic transducers 136 might be arranged within a closest packing of spheres, i.e. within a hexagonal grid, so as to enable a closer arrangement of the transducers. The transducers 136 may be controlled in a purely parallel connection, a purely serial connection, or a mixed serial/parallel connection. For further details with regard to design and connection of the transducers, please refer to the FLS technology mentioned in the introduction to the description.

FIG. 3a also shows that the high-frequency loudspeaker, too, may be made up of many electroacoustic transducers 138, specifically as a line sound source, the longitudinal axis of which extends along the aperture 130. FIG. 2 therefore showed a partial sectional top view, for example, of the embodiment of FIG. 3a, wherein only a transducer 136 and a transducer 138 were visible. FIG. 3a also shows that the acoustic transducers 138 belonging to the high-frequency loudspeaker are arranged along a lateral edge or circumference of the front side 110, said edge, or circumference, surrounding the interior of the area 131—namely from two sides, namely to the left and to the right in FIG. 3a. In yet other words, in the embodiment of FIG. 3a the mid-frequency and low-frequency transducers 136 are laterally arranged in the interior 131 of the front side 110. The transducers 138 are arranged along a line on two opposite circumferential sides of the front side 110, which is rectangular in FIG. 3a, by way of example, so as to form a line sound source for, e.g., a left-hand stereo channel, and a line sound source for a right-hand stereo channel, the mid- and low-frequency transducers 136 being arranged in between the high-tone transducers 138 or being surrounded by them.

FIG. 3b shows an alternative distribution of mid- and low-frequency loudspeakers 136. In accordance with FIG. 3b, the mid-frequency loudspeakers (MF) are arranged on the outer edge, i.e. to the left and right, of the array so as to enable stereo perception even in the frequency range associated with said mid-frequency loudspeakers, and to thus achieve improved stereo separation. The mid-frequency loudspeakers here form a line sound source along the left and right edges of the front side 110, respectively. However, they might also comprise more than one column of mid-frequency loudspeakers. The low-frequency loudspeakers (LF) are arranged in between them. Thus, they form a closed two-dimensional field of individual low-frequency loudspeakers. Due to the larger wavelengths of the low-frequency range as compared to the wavelengths of the high-tone frequency and mid-frequency ranges, the overall lateral extension of the low-frequency loudspeaker field is smaller than the emitted low-tone wavelengths, and, thus, the low-tone sound is emitted in an undirected manner.

Likewise, the horizontal extension of the two individual mid-frequency loudspeaker arrays is smaller than the wavelength of the lower cutoff frequency of the mid-frequency band, and the mid-frequency sound is emitted in an undirected manner—at least in the horizontal. This is once again illustrated in FIG. 3c, wherein $D^{total}_M$ shows the overall horizontal extension of a mid-frequency loudspeaker array, which here has two columns, by way of example, for the right-hand stereo channel. It is smaller than the smallest wavelength of the mid-frequency spectral range. The average next-neighbor center distance $d_p$ of the loudspeakers 136 is also shown. It may be identical for the mid-frequency loudspeakers and for the low-frequency loudspeakers. In particular, it may be smaller than e.g. 2 $D_{L/M}$, and still more preferably smaller than 1.5 $D_{L/M}$, or even smaller than 1.2 $D_{L/M}$. The lateral dimension, or the diameter, of the loudspeaker diaphragm of the high-frequency loudspeaker 138, namely $D_H$, may be within the same range as $D_{L/M}$ and may even be identical to $D_{L/M}$. The size $D_A$ of the acoustic aperture 130 is preferably smaller than $\frac{3}{4}D_H$, and still more preferably smaller than $D_H/2$ or even smaller than $D_H/4$.

FIG. 3c shows that the diaphragm normal 127 of the high-frequency loudspeaker 126 points into the interior of the housing 132, and the diaphragm normal 125 of the mid- and low-frequency loudspeakers 124 points—opposite thereto—away from the housing 132, so that the high-frequency loudspeaker 126 emits the sound 120 into the sound conduction 128 within the housing 132, and the mid- and low-frequency loudspeakers 124 emit sound away from the housing 132. As was already mentioned above, it would also be possible for the high-frequency loudspeakers (HF) to be provided within the rear wall so as to emit toward the interior, or toward the sound conduction—this would then mean in the same direction as the mid- and low-frequency loudspeakers.

With regard to FIGS. 3b and 3c, the following possibility shall also be pointed out. In the applications wherein the rear wall of the flat panel loudspeaker faces the listener, undirected lateral emission of high tones by the high-frequency loudspeakers is actually desired only in the direction of the listener. Unfortunately, sound portions also reach a reflection surface (wall) that might be located behind the TV set, from the listener's perspective. When reflected, this sound portion may be redirected toward the listener, and in the worst case, it will destructively superimpose with those sound portions that are diffracted directly toward the listener. This might be remedied if some of the mid-frequency loudspeakers MF additionally emit a directed anti-phase signal, and if, therefore, the interfering high-tone portion would be eliminated. In this manner, the outermost column of mid-frequency loudspeakers MF might not only have the mid-tone branch signal, but also the high-tone branch signal of the respective stereo signal applied to it, in FIG. 3b and/or 3c, on the left and right sides, respectively, said application being with a suitable phase offset in each case so as to balance off, at diffraction points, a phase offset relative to the high-tone sound leaving the neighboring aperture 130, said phase offset being due to runtime differences and a potential phase reversal. In this case, it is not harmful when the wavelengths of the high-tone range are small enough so that undirected emission by the mid-frequency loudspeakers is no longer possible. On the contrary, in this case, the high-tone sound is actually meant to balance off, in a targeted manner, that sound which might hit a potential wall in the direction of emission of the mid-frequency loudspeakers, starting from the aperture 130. The lateral extension of the mid-tone array to which the high-tone signal has additionally been applied on the right and left sides is therefore preferably within the range of the wavelength of the smallest frequency of the high-tone portion. For example, it is smaller than the lower high-tone cutoff frequency wavelength. The distance of the center of the field of mid-frequency loudspeakers, which are addressed by the phase-offset high-tone signal, from the edge of the front side 110 which has that aperture 130 formed thereon from which the high-tone sound portion to be eliminated emanates, is smaller than 2 $D_H$, for example.

With reference to FIGS. 3a and 3b, it shall once again be noted that, even though in the embodiment of these figures the sound conduction was configured in the form of a continuous groove in the left- and right-hand edges of the housing, other sound conductions would also be possible, namely in the form of a slot which does not open at the top and at the bottom of FIG. 3, but only on the left and right on the side of the housing. It shall also be noted that the above implementations may simply be transferred to a 2-way case in that, e.g., the mid-frequency loudspeakers and low-frequency loudspeakers take over the low-tone portion of the 2-way loudspeaker. The left-hand half of same might be addressed by one stereo signal, and the other half by the other stereo signal. However, a low-tone mono signal would also be possible. The high-tone sound elimination for high-tone sound leaving the aperture in the direction leading away from the listener, said elimination just having been described, would also be transferable to mono loudspeaker embodiments. In addition, the high-tone portion intended for elimination might be applied both to mid-frequency loudspeakers and to low-frequency loudspeakers, such as to the outermost column of mid-frequency loudspeakers in FIG. 5b and to the outermost column of low-frequency loudspeakers, which is adjacent thereto.

FIG. 4a shows that the aperture 130, which is given the shape of a slot and is located within the housing, may be formed such that the slot may widen toward the outside in terms of its cross-section in order to suppress standing waves within the slot. In accordance with FIG. 4a, the slot has—at that site where it opens toward the outside within the housing—a curvature 140, and, in accordance with FIG. 4b, a bevel, or taper, 142 formed within the housing. Absorption material might be present at the slot output so as to reduce standing waves.

It was frequently described above that the loudspeaker comprising the sound conduction and the acoustic aperture may act as a high-tone loudspeaker that has a mid-frequency and/or a low-frequency loudspeaker arranged in parallel with it so as to yield a 2-way, 3-way or multi-way flat panel loudspeaker. FIG. 5 shows a possible control circuit that may be used in these embodiments so as to output, from an incoming audio signal at an audio signal input 144, corresponding way signals at corresponding outputs 146. The control circuit of FIG. 5 comprises a frequency splitter 148 that is connected, with its input, to the input 144 and has an output for each way, i.e. for the high-tone way, the mid-tone way and the low-tone way. The frequency splitter 148 is configured to split the entire frequency spectrum of the incoming audio signal 144 of, e.g., 20 Hz to 20,000 Hz into corresponding frequency bands, such as a high-tone range, a mid-tone range and a low-tone range, which border on one another or only slightly overlap one another. A further possibility is that all of the transducers 136 reproduce the low tone and that a subset thereof additionally reproduces the mid-tone signal. The high-tone frequency range has a lower cutoff frequency of 1,000 Hz, for example, with an associated sound wavelength of 34 cm, which is thus larger than the above dimensional indication for the acoustic aperture. An upper cutoff frequency for the mid-tone and/or low-tone range may again be 1,000 Hz, the associated wavelength of the sound being sufficiently large, again, to result in undirected emission given the above indications for lateral dimensions of the corresponding mid- and/or low-tone loudspeaker arrays. As is shown in FIG. 5, the corresponding outputs of the frequency splitter 148 may be followed by an equalizer 150 and an amplifier 152, respectively, which are serially cascaded so as to be connected between the respective output of the frequency splitter 148 and the respective way output 146. As has been mentioned, the low-tone signal may be applied to the low-frequency loudspeakers in a parallel, serial or mixed parallel/serial manner, which also applies to the mid-frequency and high-frequency loudspeakers.

FIG. 6 shows a side view of a flat panel loudspeaker modified, as compared to that of FIG. 3a, in that the electroacoustic transducers 138 arranged in a line do not form a shared line array or a shared line sound source, but that same are subdivided, in the line direction, into line array elements 154 in that, specifically, the associated sound conduction, and/or the associated slot 128 into which the transducers 138 emit are also subdivided along the line direction 156 so as to form individual chambers 158, such as by corresponding lands 160 extending from an inner side 162 of the wall—which is arranged closer to the display 102, or further toward the front—via the width of the slot toward an opposite inside 164 of a wall of the housing—said wall being arranged further away from the display—and run in a lateral direction transverse to the arrangement direction 156 so as to thus subdivide the slot 128 into the previously mentioned chambers 158 into which the individual line array elements 154 emit. The subdivision enables avoiding standing waves, which might otherwise form in the direction of the arrangement 156, in that the resonant frequency is increased.

The above embodiments shall once again be summarized in other words below. The above embodiments had in common that the aperture size was reduced as compared to the wavelength so that sound is emitted in an undirected manner. In the above embodiments, this also applied to the sound of the high-frequency loudspeaker. However, other embodiments are also possible, of course, wherein the flat panel loudspeaker is not configured as a multi-way loudspeaker, so that one may speak of a loudspeaker in general terms only.

The above embodiments always constituted flat panel loudspeakers that were mounted to a display back to back. The existence of a display is not absolutely necessary, however. For example, other embodiments provide that the rear of the loudspeaker, i.e. the rear of the housing of the flat panel loudspeaker, is used differently, for example as a board or projection plane for a projector. In this case, the above reference numerals 102 might form the rear wall of the housing, which is opposite the rack supporting the loudspeakers. If a display were dispensed with, the definition of front and rears of the flat panel loudspeaker would be undermined also for other embodiments. Since the high-frequency loudspeakers of the above embodiments emit into the interior of the housing, and the mid- and/or low-frequency loudspeakers emit outward, the side 110 may be considered as the front side, as was already done above. However, it is also possible to regard the side 110 as the rear, specifically when considering the application wherein this very side is intended to face away from the listener. However, it shall be noted that above embodiments of flat panel loudspeakers naturally would also be usable in an inverted manner, in principle, i.e. with the mid- and/or low-frequency loudspeakers facing the listeners.

In the above embodiments, the loudspeaker interacting with the sound conduction was also configured, in addition, as a line sound source consisting of many small electroacoustic transducers. As was shown above, the acoustic aperture, or the adapter, or the sound conduction, may be configured in the form of a slot in order to achieve undirected emission. In one dimension, the slot size may be considerably smaller than the wavelength of the highest frequency to be emitted in an undirected manner, as was described above. The sound conduction in the form of a slot may be filled with a suitable sound-conducting medium. In the previous embodiments, this was air, by way of example. However, the sound-conducting medium might also be a solid body for body sound conduction. In order to suppress standing waves, which are known to occur in slot-shaped arrangements, the slot may be widened toward the outside in terms of its cross-section, as was shown with reference to FIGS. 4a and 4b, similarly to a horn (cf. FIG. 4a). Alternatively or additionally, insulating material might be arranged at a suitable location within the slot, as in a velocity maximum. In addition, it would also be possible to suitably position the drivers 138, for example within the node of a vibrational mode. What is also advantageous is a vertical subdivision of the slot into smaller chambers in order to shift the base resonance toward higher frequencies, as was described above with reference to FIG. 6. In the embodiment of FIG. 6, the high-tone drivers formed a line array, namely 12 drivers in this case. They were subdivided into three groups of four, and arranged within the closed housing consisting of the wall 162, the opposite wall 110, and the lateral edges. The housing had a slot as an acoustic aperture 130. Mid- and low-frequency loudspeakers emitted rearward in an undirected manner. Just like the slot may have a curvature, as was shown in FIG. 4a, i.e., for example, like an exponential horn of a horn loudspeaker, the slot may also be provided with a bevel, or be tapered, as was shown in FIG. 4b. Alternative embodiments do not comprise a slot as the acoustic aperture, but holes.

With reference to above embodiments it shall once again be noted that the lateral planar shape of the flat panel loudspeaker, namely a rectangle, was only exemplary. Of course, other shapes are also possible, such as other polygon shapes or round shapes. In the embodiment of FIG. 6, separation of the line array elements and the acoustic aperture was in the vertical direction. Likewise, however, the flat panel loudspeaker might also be set up or designed differently, in which case the subdivision would be in the horizontal direction, and the slots would extend horizontally. In addition, it is possible to build above-mentioned line loudspeakers directly from a line sound transducer rather than in a discrete manner from individual loudspeakers arranged in a line. Actually, miniature loudspeakers as are used in headphones, for example, may be considered for being used as above-mentioned individual loudspeakers.

The invention claimed is:

1. A flat panel loudspeaker comprising
a housing comprising a front side and a rear side;
a high-frequency loudspeaker within the housing; and
a mid- or low-frequency loudspeaker arranged so as to emit outwardly away from the rear side of the housing; and
a sound conduction configured to conduct sound from the high-frequency loudspeaker via an acoustic aperture within the housing outwards,
wherein the acoustic aperture is formed in a lateral side of the housing extending between, and connecting, the front side and the rear side, in form of a series of holes or in form of a slit in the lateral side, wherein a longitudinal extension of the series of holes or the slit extends circumferentially with respect to the front and rear sides and a width of the series of holes or the slit in a thickness direction via which front and rear sides are distanced from each other is smaller than a wavelength of a highest frequency of the sound from the high-frequency loudspeaker so that the sound emitted by the high-frequency loudspeaker is radiated from the acoustic aperture in a plane perpendicular to the longitudinal direction in a nearly equiangular manner so that a perceivable portion of the sound emitted by the high-frequency loudspeaker propagates into a direction into which the front side of the housing faces.

2. The flat panel loudspeaker as claimed in claim 1, wherein the width is smaller than a loudspeaker diaphragm diameter of the high-frequency loudspeaker.

3. The flat panel loudspeaker as claimed in any of the previous claims, wherein a diaphragm normal of the high-frequency loudspeaker points toward the interior of the housing, so that the high-frequency loudspeaker emits the sound into the sound conduction within the housing.

4. The flat panel loudspeaker as claimed in claim 3, wherein a diaphragm normal (125) of the mid- and/or low-frequency loudspeaker points away from the housing, inversely to the diaphragm normal of the high-frequency loudspeaker, so that the high-frequency loudspeaker emits the sound into the sound conduction within the housing, and the mid- and/or low-frequency loudspeaker emits sound away from the housing.

5. The flat panel loudspeaker as claimed in claim 1, wherein the sound conduction is filled with a sound-conducting medium.

6. The flat panel loudspeaker as claimed in claim 5, wherein the sound-conducting medium is air or a solid body.

7. The flat panel loudspeaker as claimed in claim 1, wherein the acoustic aperture is formed, within the lateral side of the housing, in the form of a slot which widens toward the outside in terms of its cross-section in order to suppress standing waves within the sound conduction.

8. The flat panel loudspeaker as claimed in claim 7, wherein the slot comprises a bevel or curvature so as to widen toward the outside.

9. The flat panel loudspeaker as claimed in claim 1, wherein the sound conduction is subdivided into smaller chambers in order to shift a base resonance.

10. The flat panel loudspeaker as claimed in claim 1, wherein a high-tone range of the high-frequency loudspeaker is above 100 or above 200 Hz.

11. The flat panel loudspeaker as claimed in claim 1, wherein the high-frequency loudspeaker is associated with a left-hand stereo channel, and the flat panel loudspeaker further comprises a further high-frequency loudspeaker associated with a right-hand stereo channel, and a further sound conduction
configured to conduct sound from the further high-frequency loudspeaker via a further acoustic aperture within the housing outwards, the acoustic apertures being formed within the lateral side of the housing such that they are spatially separate, wherein the further acoustic aperture is formed in the lateral side of the housing in form of a further series of holes or in form of a further slit in the lateral side so that sound emitted by the further high-frequency loudspeaker is radiated from the further acoustic aperture nearly cylindrically.

12. The flat panel loudspeaker as claimed in any of claims 10 to 11, wherein, when seen in a projection along the thickness direction, the mid and/or low-frequency loudspeaker is laterally arranged within an interior of an area of the rear side of the housing, the high-frequency loudspeaker being arranged along a lateral circumferential portion of the area of the rear side of the housing, surrounding the interior of the area.

13. The flat panel loudspeaker as claimed in claim 12, wherein the mid and/or low-frequency loudspeaker is formed of a two-dimensional distribution of electroacoustic transducers.

14. The flat panel loudspeaker as claimed in claim 1, wherein the flat panel loudspeaker comprises a display on the front side of the housing.

15. The flat panel loudspeaker as claimed in claim 14, wherein the display has a lateral extension, so that a projection of an image display area of the display overlaps with the high-frequency loudspeaker along the thickness direction.

16. The flat panel loudspeaker as claimed in claim 1, wherein an outwardly emitting loudspeaker is formed within the front side of the housing adjacently to the acoustic aperture and is controlled with a first high-tone signal that is offset in phase relative to a second high-tone signal with which the high-frequency loudspeaker within the housing is controlled, so as to effect destructive superposition with sound of the high-frequency loudspeaker within the housing, said sound leaving the acoustic aperture in a direction in which the front side is pointing.

17. The flat panel loudspeaker as claimed in claim 16, wherein the loudspeaker within the front side of the housing is a mid-frequency or low-frequency loudspeaker controlled, in addition to the first high-tone signal, with a mid-tone or low-tone signal.

18. A TV set or flat screen comprising a flat panel loudspeaker as claimed in claim 1.

19. The flat panel loudspeaker as claimed in claim 1, wherein a distance between the housing's front and rear sides is less than a loudspeaker diaphragm diameter of the high-frequency loudspeaker.

20. The flat panel loudspeaker as claimed in claim 3, wherein a diaphragm normal of the mid- and/or low-frequency loudspeaker points away from the housing, in parallel to, or anti-parallel to, the diaphragm normal of the high-frequency loudspeaker.

21. The flat panel loudspeaker as claimed in claim 13, wherein an overall extension of the two-dimensional distribution of electroacoustic transducers along the longitudinal direction of the series of holes or the slit, is smaller than a length of the series of holes or the slit along the longitudinal direction of the series of holes or the slit.

22. A flat panel loudspeaker comprising
a housing;
a loudspeaker within the housing; and
a sound conduction configured to conduct sound outward from the loudspeaker via an acoustic aperture within the housing for undirected emission,
wherein the loudspeaker is a high-frequency loudspeaker, the diaphragm normal of which points toward the interior of the housing, so that the high-frequency loudspeaker emits the sound into the sound conduction within the housing, and
wherein the flat panel loudspeaker further comprises a mid- or low-frequency loudspeaker, a diaphragm normal of the mid- and/or low-frequency loudspeaker pointing away from the housing, inversely to the diaphragm normal of the high-frequency loudspeaker, so that the high-frequency loudspeaker emits the sound into the sound conduction within the housing, and the mid- and/or low-frequency loudspeaker emits sound away from the housing.

23. A flat panel loudspeaker comprising
a housing;
a loudspeaker within the housing; and
a sound conduction configured to conduct sound outward from the loudspeaker via an acoustic aperture within the housing for undirected emission,
wherein the acoustic aperture is formed laterally within the housing, an outwardly emitting loudspeaker being formed within a front side of the housing adjacently to the acoustic aperture and being controlled with a first high-tone signal that is offset in phase relative to a second high-tone signal with which the loudspeaker within the housing is controlled, so as to effect destructive superposition with sound of the loudspeaker within the housing, said sound leaving the acoustic aperture in a direction in which the front side is pointing.

24. A flat panel loudspeaker comprising
a housing comprising a front side and a rear side;
a high-frequency loudspeaker within the housing; and
a mid- or low-frequency loudspeaker arranged so as to emit outwardly away from the rear side of the housing; and
a sound conduction configured to conduct sound from the high-frequency loudspeaker via an acoustic aperture within the housing outwards,
wherein the high-frequency loudspeaker is formed by electro-acoustical transducers arranged along a line so as to form a line sound source, and the acoustic aperture is formed in a lateral side of the housing extending between, and connecting, the front side and the rear side, in form of a series of holes or in form of a slit in the lateral side along which a longitudinal axis of the line sound source extends so that sound emitted by the high-frequency loudspeaker is radiated from the acoustic aperture nearly circularly in a plane perpendicular to the line along which the electro-acoustical transducers are arranged.

25. The flat panel loudspeaker as claimed in claim 24, wherein a distance between the housing's front and rear sides is less than a loudspeaker diaphragm diameter of the high-frequency loudspeaker's electro-acoustical transducers.

26. The flat panel loudspeaker as claimed in claim 25, wherein a length of line sound source formed by the high-frequency loudspeaker's electro-acoustical transducers is more than half a width of the flat panel loudspeaker along the line sound source's longitudinal direction.

27. The flat panel loudspeaker as claimed in claim 21, wherein the two-dimensional distribution of electroacoustic transducers is laterally positioned in a center of the area of the rear side of the housing.

* * * * *

UNITED STATES PATENT AND TRADEMARK OFFICE
CERTIFICATE OF CORRECTION

| | | |
|---|---|---|
| PATENT NO. | : 8,798,302 B2 | Page 1 of 1 |
| APPLICATION NO. | : 12/959183 | |
| DATED | : August 5, 2014 | |
| INVENTOR(S) | : Lutz Ehrig and Daniel Beer | |

It is certified that error appears in the above-identified patent and that said Letters Patent is hereby corrected as shown below:

On the Title Page (75) Inventors:

Lutz Ehrig, Iimenau (DE)

should be:

Lutz Ehrig, ILMENAU (DE)

On the Title Page (73) Assignee:

Fraunhofer-Gesellschaft zur Foerderung der Angewandten Forschung E.V.

should be:

Fraunhofer-Gesellschaft zur Foerderung der angewandten Forschung e.V.

Signed and Sealed this
Sixteenth Day of June, 2015

Michelle K. Lee
*Director of the United States Patent and Trademark Office*